(12) United States Patent
Brun et al.

(10) Patent No.: US 11,901,089 B2
(45) Date of Patent: Feb. 13, 2024

(54) NUCLEAR REACTOR WITH IN-VESSEL EX-CORE NEUTRON DETECTORS AND CORRESPONDING CONTROL METHOD

(71) Applicant: Société Technique pour l'Energie Atomique, Villiers le Bacle (FR)

(72) Inventors: Michel Brun, Simiane-Collongue (FR); Sandrine Spyckerelle, Aix-en-Provence (FR)

(73) Assignee: Société Technique pour l'Energie Atomique, Villiers le Bacle (FR)

( * ) Notice: Subject to any disclaimer, the term of this patent is extended or adjusted under 35 U.S.C. 154(b) by 0 days.

(21) Appl. No.: 16/629,344

(22) PCT Filed: Jul. 12, 2018

(86) PCT No.: PCT/EP2018/068944
§ 371 (c)(1),
(2) Date: Jan. 8, 2020

(87) PCT Pub. No.: WO2019/012044
PCT Pub. Date: Jan. 17, 2019

(65) Prior Publication Data
US 2020/0227181 A1    Jul. 16, 2020

(30) Foreign Application Priority Data
Jul. 12, 2017 (FR) .................................. 17 56619

(51) Int. Cl.
*G21C 17/108* (2006.01)
*G21C 13/02* (2006.01)
*G21C 17/116* (2006.01)

(52) U.S. Cl.
CPC ........... *G21C 17/108* (2013.01); *G21C 13/02* (2013.01); *G21C 17/116* (2013.01)

(58) Field of Classification Search
CPC ...... G21C 17/06; G21C 17/10; G21C 17/108; G21C 17/18; G21C 1/08; G01T 3/00
See application file for complete search history.

(56) References Cited

U.S. PATENT DOCUMENTS 4,877,575 A * 10/1989 Impink, Jr. ............... G21C 7/36
376/216
6,236,698 B1 * 5/2001 Hirukawa ............ G21C 17/108
376/245

(Continued)

FOREIGN PATENT DOCUMENTS

JP    H-04232497 A   *  8/1992
JP    H04232497 A      8/1992

(Continued)

OTHER PUBLICATIONS

Corresponding Search report for PCT/EP2018/068944.

(Continued)

*Primary Examiner* — Lily C Garner
(74) *Attorney, Agent, or Firm* — Davidson, Davidson & Kappel, LLC

(57) ABSTRACT

A nuclear reactor (1) includes a vessel (3) has a central axis (X); and a core (5) arranged in the vessel (3). The core (5) includes a plurality of nuclear fuel assemblies, a primary water layer (7) separating the core (5) from the vessel (3) radially from the central axis (X) and surrounding the core (5); and a system (9) for controlling and protecting the nuclear reactor. The control and protection system (9) includes a device (11) for continuously measuring the neutron flux emitted by the core (5). The measuring device (11) includes at least one neutron detector (12) arranged in the primary water layer (7) separating the core (5) from the vessel (3).

16 Claims, 3 Drawing Sheets

(56) References Cited

U.S. PATENT DOCUMENTS

| | | | | |
|---|---|---|---|---|
| 6,477,219 B2* | 11/2002 | Hirukawa | ............ | G21C 17/108 |
| | | | | 376/217 |
| 6,744,840 B2* | 6/2004 | Karino | ................ | G21C 17/108 |
| | | | | 376/245 |
| 9,208,907 B2* | 12/2015 | Krieg | ........................ | G21D 3/04 |
| 10,748,665 B2* | 8/2020 | Mathieu | .................... | G21C 7/36 |
| 10,964,438 B2* | 3/2021 | van der Ende | ...... | G21C 17/108 |
| 2010/0119026 A1* | 5/2010 | Gautier | ................ | G21C 17/10 |
| | | | | 376/254 |
| 2017/0140842 A1* | 5/2017 | Heibel | .................... | G21C 7/24 |

FOREIGN PATENT DOCUMENTS

| | | | | | |
|---|---|---|---|---|---|
| JP | 09264984 | A | * | 10/1997 | |
| JP | 2008014705 | A | * | 1/2008 | |
| JP | 2008175732 | A | * | 7/2008 | |
| JP | 2008175732 | A | | 7/2008 | |
| JP | 2011107105 | A | * | 6/2011 | |
| JP | 4772706 | B2 | * | 9/2011 | |
| JP | 5443901 | B2 | * | 3/2014 | |
| WO | WO 2015/099855 | | | 7/2015 | |
| WO | WO-2017079949 | A1 | * | 5/2017 | ............. G21C 17/10 |

OTHER PUBLICATIONS

Corresponding Search Report for FR1756619.
Verma V et al: "Neutron Flux Monitoring with In-Vessel Fission Chambers to Detect an Inadvertent Control Rod withdrawal in a Sodium-Cooled Fast Reactor", Annals of Nuclear Energy, Pergamon Press, Oxford, GB, vol. 94, Apr. 23, 2016, pp. 487-493.

* cited by examiner

NUCLEAR REACTOR WITH IN-VESSEL EX-CORE NEUTRON DETECTORS AND CORRESPONDING CONTROL METHOD

The invention generally relates to systems for running and protecting nuclear reactors, usually referred to as Instrumentation & Control (I&C).

More specifically, according to a first aspect, the invention relates to a nuclear reactor equipped with such an instrumentation and control system.

BACKGROUND

Instrumentation and control systems typically include a device for continuously measuring the neutron flux emitted by the core. This device continuously measures the neutron flux, both upon starting up the reactor and during its normal operation, with power.

The instrumentation and control system protects the reactor, based inter alia on information supplied by the device for measuring the neutron flux. The system must take real-time measurements over the entire power range of the reactor, from the source level to full power.

It is therefore very important for the latter to supply neutron measurements with a short time constant, ranging from several tens of seconds to a fraction of a second, compatible with the required performance for the protection function.

The neutron detectors of the device for continuously measuring the neutron flux are generally arranged outside the vessel of the reactor. The counting rate of these detectors depends on:
- the sensitivity of the detector, which is limited for the available technologies to a value from about 0.1 to 40 cp/(n/cm$^2$·s);
- the residual flux outside the vessel, which in turn depends on the one hand on the residual activity of the core when stopped and on the other hand on the geometry of the reactor.

The counting rate directly affects the response time constant of the instrumentation and control system.

On nuclear reactors having a small core, for example SMRs (Small and Modular Reactor), the counting rates may be too low to guarantee a fast enough response time with respect to accidents that may occur upon starting up the reactor.

A first possibility is to perform technological developments making it possible to improve the sensitivity of neutron detectors. This sensitivity can be increased by associating a large number of unitary detector cells in parallel. However, this solution comes up against technological limitations, in particular the shadow effect between the different cells. Furthermore, it leads to a significant increase in the cost of the detectors.

Another solution would be to set up a neutron path with low attenuation. Such a solution is for example described in WO 2015/099855. This solution has the flaw of locally creating a discontinuity in the radiological protection of the vessel and the facility.

Furthermore, the so-called "in-core" neutron chains, the role of which is to make periodic maps of the neutron flux in the core, cannot be used to perform the neutron measurements necessary for the instrumentation and control system of the nuclear reactor. The so-called in-core chains do not cover the entire range and/or are not real-time measurements. Furthermore, the detectors of the in-core chains are not positioned continuously in the core and must be removed so as not to be used up too quickly by the fluence of the core.

SUMMARY

In this context, a nuclear reactor is provided whose device for continuous measuring of the neutron flux does not have the above flaws.

To that end, the nuclear reactor includes:
- a vessel having a central axis;
- a core positioned in the vessel, the core comprising a plurality of nuclear fuel assemblies, a primary water layer separating the core from the vessel radially from the central axis and surrounding the core;
- an instrumentation and control system of the nuclear reactor configured to provide the instrumentation and control of the reactor in a predetermined power range, typically a residual power upon stopping and a nominal power, said instrumentation and control system comprising a device for continuous measurement of the neutron flux emitted by the core; characterized in that the measuring device comprises at least one neutron detector continuously measuring said neutron flux, the neutron detector(s) being positioned in the primary water layer radially between the core and the vessel, the neutron detector(s) being placed in one or several radial position(s) chosen to obtain, owing to the attenuation of the water layer, one or several counting rates suitable for the instrumentation and control system of the nuclear reactor for the entire predetermined power range.

Arranging the or each neutron detector in the water layer makes it possible to optimize the response of the detector for the entire measuring range. It is close enough to the core to have a sufficient counting rate upon starting up the reactor, allowing a suitable response time of the instrumentation and control system of the reactor in case of abnormal situation of the reactor.

When the reactor works at full power, on the one hand the water layer ensures a sufficient attenuation of the flux for the detector to stay within its measuring range, and on the other hand the water layer offers sufficient protection, such that the lifetime of the neutron detector is satisfactory.

These results are obtained without having to create a discontinuity in the radiological protection, since the water layer located between the core and the environment, including the vessel, remains intact.

The reactor may further have one or more of the features below, considered individually or according to any technical possible combination(s):
- the or each nuclear detector is directly submerged in the primary water, without insertion of a gloved finger;
- at least one of the neutron detectors is a fixed detector, positioned at a fixed radial distance from the core;
- said radial distance is chosen such that:
  - when the nuclear reactor is stopped, the neutron flux at the fixed detector corresponds to a counting of between 1 and 100 cp/s;
  - when the nuclear reactor is operating at full power, the neutron flux at the fixed detector corresponds to a measurement staying within a measuring range in the current mode of the fixed detector;
- all of the neutron detectors are fixed and are positioned at said radial distance from the core;
- all of the neutron detectors are fixed, at least two of the neutron detectors being positioned at different respective radial distances from the core from one another, suitable for different power ranges of the nuclear reactor;

at least one of the neutron detectors is a moving detector, radially movable relative to the core in the primary water layer;

the measuring device comprises a movement mechanism of the moving detector, configured to move the moving detector radially at least between an inner position relatively closer to the core and an outer position relatively further from the core;

the inner position is chosen such that, when the nuclear reactor is stopped, the neutron flux at the moving detector corresponds to a counting of between 1 and 100 cp/s;

the outer position is chosen such that, when the nuclear reactor is operating at full power, the neutron flux at the moving detector corresponds to a measurement staying within a measuring range in the current mode of the moving detector;

the measuring device comprises at least one fixed detector and at least one moving detector.

Preferably, the nuclear reactor comprises at least one neutron absorbing member, and a movement device capable of inserting the or each neutron absorbing member into the core, the instrumentation and control system comprising a controller configured to control the movement device by using measurements done by the or each neutron detector.

A method for controlling a nuclear reactor having the features above is also provided:

when the nuclear reactor is stopped or operating at a power below a first limit, measuring the neutron flux emitted by the core with the or each moving detector, placed in the inner position;

when the nuclear reactor is operating at a power above the first limit, measuring the neutron flux emitted by the core with the or each fixed detector.

Furthermore, the controlling method can be such that the or each moving detector is moved to the outer position when the nuclear reactor goes from a power below a second limit to a power above the second limit.

BRIEF SUMMARY OF THE DRAWINGS

Other features and advantages of the invention will emerge from the detailed description given below, by way of indication and without limitation, with reference to the annexed figures, including.

DETAILED DESCRIPTION

Figure 1:
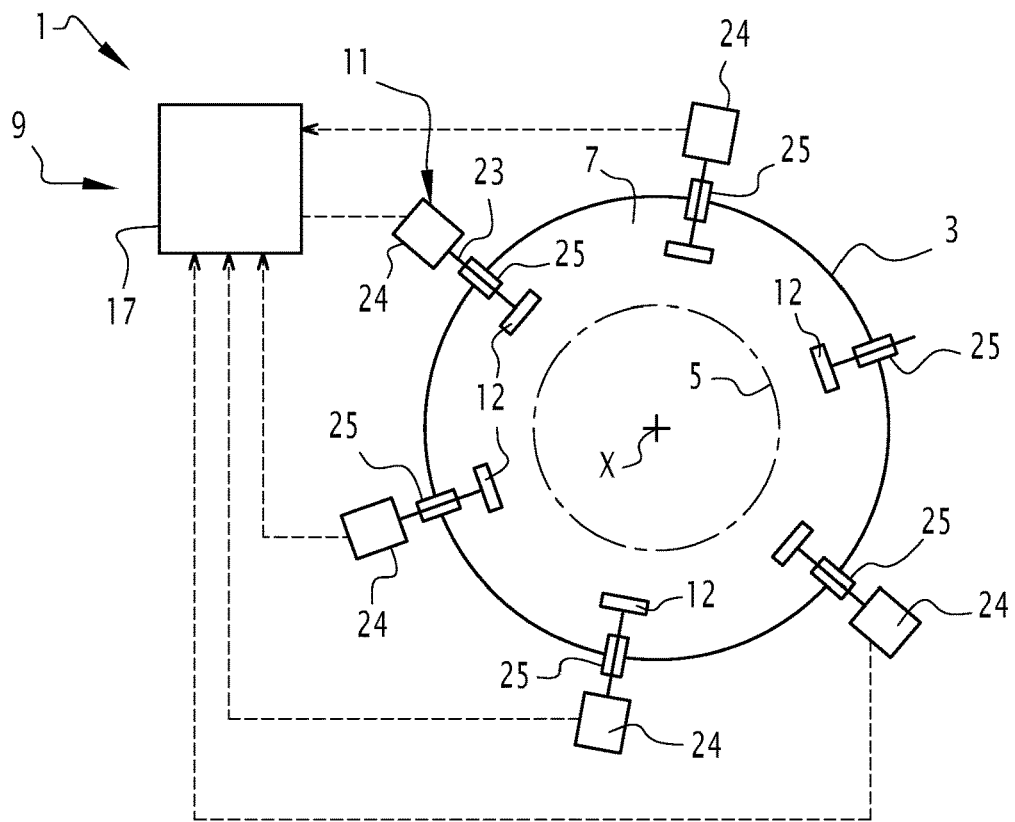
FIG. 1 is a simplified schematic illustration of a nuclear reactor according to a first embodiment, considered in section in a plane perpendicular to the central axis of the vessel.

The nuclear reactor 1 shown in FIG. 1 is typically a pressurized water reactor (PWR) of the SMR (Small and Modular Reactor) type. In a variant, this reactor is of another type, for example is a high-power reactor, or on the contrary a low-power reactor, or a test reactor.

The nuclear reactor 1 comprises a vessel 3 having a central axis X, and a core 5 arranged in the vessel 3.

The core 5 comprises a plurality of nuclear fuel assemblies.

The vessel 3 is filled with the primary liquid, which here is water, with any additives. The primary liquid is designated here by the term primary water.

The vessel 3 typically contains still other equipment. It contains the lower and upper core plates, partitions arranged around nuclear fuel assemblies and in particular making it possible to channel the circulation of the primary water inside the vessel, and still other inners that are not listed here.

A primary water layer 7 separates the core 5 from the vessel 3 radially from the central axis X.

The primary water layer 7 completely surrounds the core, that is to say, extends over the entire periphery of the core.

It radially has a thickness of between 100 and 800 mm.

Thus, the core 5 occupies the center of the vessel, the primary water layer 7 having an annular shape and occupying the periphery of the vessel 3.

The nuclear reactor 1 further includes an instrumentation and control system 9 of the nuclear reactor. It is configured to provide the instrumentation and control of the reactor in a predetermined power range, typically between a residual power upon stopping and a nominal power of the nuclear reactor.

The system 9 in turn comprises a device 11 for continuously measuring the neutron flux emitted by the core 5.

The device 11 for continuously measuring the neutron flux comprises a plurality of neutron detectors 12, continuously measuring said neutron flux.

Figure 2:
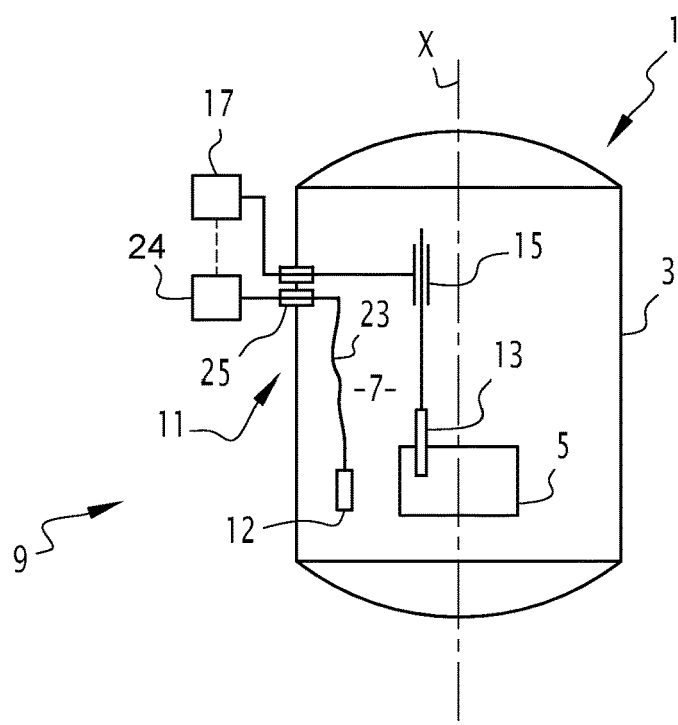
FIG. 2 is a simplified schematic illustration of the nuclear reactor of FIG. 1, considered in section in a radial plane relative to the central axis of the vessel.
Figure 3:
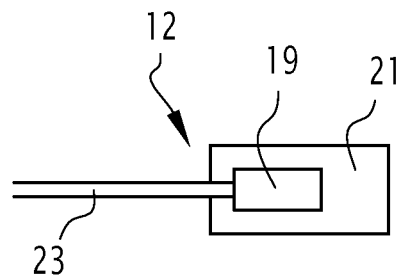
FIG. 3 is a schematic illustration of a neutron detector of FIG. 1.

The nuclear reactor 1 further includes at least one neutron absorbing member 13 and a movement device 15 capable of inserting the or each neutron absorbing member 13 into the core 5 (FIG. 2). Typically, the nuclear reactor includes a plurality of neutron absorbing members 13, called control bar or control cluster, a single one of these members being shown in FIG. 2. These members are made from a neutron-absorbing material. They are typically moved vertically by the device 15, so as to vary the reactivity of the core.

The instrumentation and control system 9 comprises a controller 17 configured to control the movement device 15 of the or each neutron absorbing member, by using the measurements done by the neutron measuring device 11.

The controller 17 is configured, during normal operation of the nuclear reactor, to control the movement device 15 so as to control one or several operating parameters of the reactor, such as the average temperature in the core or the axial offset.

The controller 17 is configured so as, in an abnormal situation of the reactor, to control the movement device 15 to ensure the protection of the reactor. Typically, the controller 17 for example causes the drop of at least certain neutron absorbing members 13, so as to cause an emergency stop of the nuclear reactor.

The measuring device 11 must therefore imperatively supply a continuous measurement of the neutron flux emitted by the core 5, so as to allow the instrumentation and control system to perform continuous monitoring of the core and to intervene at any time in case of accidental situation.

The or each neutron detector 12 is arranged in the water layer 7 separating the core 5 from the vessel 3, radially between the core 5 and the vessel 3, the neutron detector(s)

12 being placed in one of the chosen radial position(s) in order to obtain, owing to the attenuation of the water layer 7, one or several counting rates suitable for the instrumentation and control system of the nuclear reactor 9 for the entire predetermined power range.

The or each neutron detector 12 is therefore positioned in the vessel, but outside the core (in-vessel ex-core).

The or each neutron detector 12 is directly submerged in the primary water, without insertion of a gloved finger of the type used to introduce the in-core probes into the core of a nuclear reactor.

In other words, each neutron detector 12 is placed continuously in the primary water layer 7, and is not inserted inside a pipe communicating with the outside of the vessel, and allowing the insertion and removal of the neutron detector in the vessel.

The or each neutron detector 12 is of an appropriate type to work continuously at a temperature compatible with the conditions prevailing in the vessel 3, that is to say, with a temperature in the order of 300° C. For example, the neutron detector 12 comprises a measuring member 19 sold by the company Photonis under reference CFUC07.

The measuring member 19 is protected from the pressure by a metal jacket 21. The metal jacket 21 completely surrounds the measuring member 19. It is sized to withstand the pressure prevailing in the vessel 3 of the nuclear reactor. It is for example made from stainless steel or inconel.

The or each neutron detector 12 is physically connected by a cable 23 to a measuring chain 24 located outside the vessel 3. The measuring signals pass through the cable 23.

The measuring device 11 further includes electrical penetrations 25 through which the cables 23 pass through the vessel 3. The electrical penetrations 25 are advantageously of the type described in patent application WO 2017/001409.

The measuring chain 24 collects the data supplied by the or each neutron detector 12. It is of the so-called large dynamic type, allowing a measurement over approximately 10 to 12 decades with a same detector. This measuring chain is advantageously according to standard IEC 61501 dated November 1998.

The measuring chain 24 is typically used in counting mode at the bottom of the measuring range, and in current mode at the top of the measuring range. When it is used in counting mode, the measuring chain 24 measures the number of blows per second recorded by the detector 12. When it is used in current mode, the measuring chain 24 measures the electrical current of the signal transmitted by the detector 12.

According to a first embodiment, shown in FIG. 1, the or each neutron detector 12 is a fixed detector, positioned at a fixed radial distance from the core 5.

This embodiment is typically implemented when the instrumentation and control system 9 is satisfied with one measurement over 10 to 12 decades. This is in particular the case for cores 5 having a substantial residual activity upon stopping.

The radial distance between the or each detector 12 and the core 5 is chosen such that both of the following conditions are verified.

When the nuclear reactor 1 is stopped, the neutron flux at the fixed detector 12 corresponds to a counting of between 1 and 100 cp/s, preferably between 5 and 50 cp/s.

When the nuclear reactor 1 is operating at full power, the neutron flux at the fixed detector 12 corresponds to a measurement staying within a measuring range in the current mode of the neutron detector 12.

In the case of a neutron detector with a measuring member 19 of type CFUC07, the measuring range in current mode is about 2 mA at the top of the range.

Advantageously, the measuring device 11 comprises a plurality of neutron detectors 12 distributed circumferentially around the core 5, as illustrated in FIG. 1.

All of the neutron detectors 12 are fixed and are positioned at the same radial distance from the core 5.

The number of neutron detectors 12 depends on the level of redundancy required for safety and availability reasons. For example, the measuring device includes five detectors 12, each associated with a dedicated measuring chain 24.

Each measuring chain 24 supplies the value of the neutron flux measured by the neutron detector 12 corresponding to the controller 17.

Preferably, the measuring device includes a sixth neutron detector 12, commissioned only in case of failure of one of the other five neutron detectors 12. It is then connected to the measuring chain 24 of the failing detector.

Figure 4:
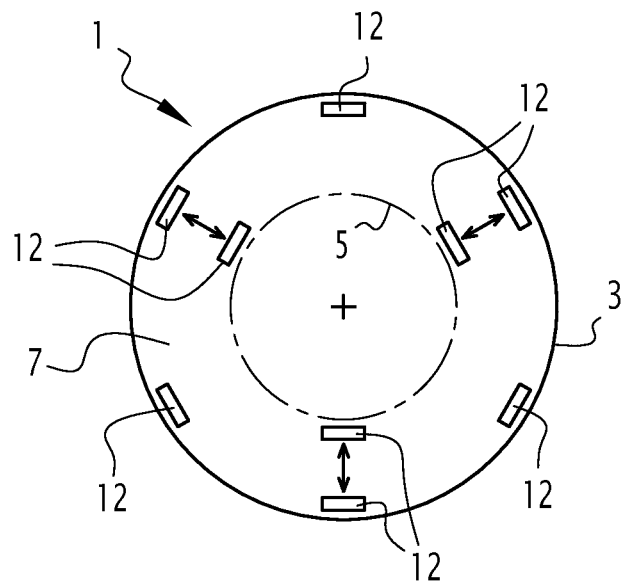
FIG. 4 is a view similar to that of FIG. 1, for a nuclear reactor according to a second embodiment of the invention.

A second embodiment of the invention will now be described, in reference to FIG. 4. Only the differences between the second embodiment and the first embodiment will be described in detail below.

Identical elements or elements performing the same function will be designated using the same references as in the first embodiment.

This second embodiment is particularly suitable for the case where the instrumentation and control system of the reactor requires a measurement over more than ten decades. This is in particular the case for power-generating reactors recharged with a new core.

In the second embodiment, the measuring device 11 comprises at least one fixed neutron detector 12, and at least one moving neutron detector 12.

Typically, the measuring device 11 includes a plurality of fixed detectors 12 and a plurality of moving detectors 12.

The fixed detectors and the moving detectors are of the type described above in reference to the first embodiment, and typically have all of the same detection performances.

The fixed detectors 12 are arranged as described in reference to the first embodiment.

The or each moving detector 12 is radially movable relative to the core 5 in the primary water layer 7.

Figure 5:
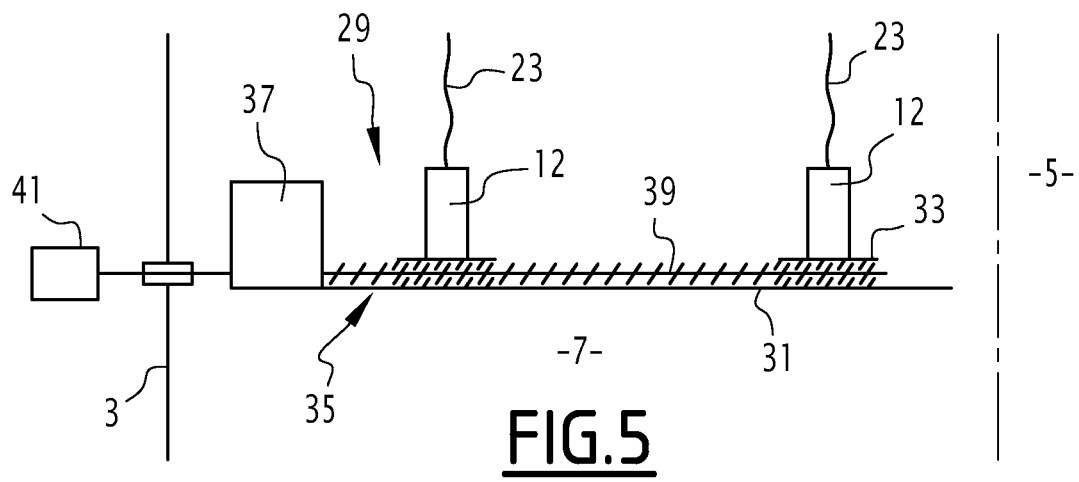
FIG. 5 is a simplified schematic illustration of the movement mechanism of one of the moving detectors of FIG. 4.

In this case, the measuring device 11 comprises, for the or each moving detector 12, a movement mechanism 29 of the moving detector 12 (see FIG. 5). The movement mechanism 29 is configured to move the moving detector 12 radially between at least an inner position relatively closer to the core 5 and an outer position relatively further from the core 5.

The or each fixed detector 12 is placed at a first radial distance from the core 5.

The or moving detector 12, in the outer position, is preferably located substantially at said first radial distance from the core 5.

The amplitude of the radial movement of each moving detector 12 is for example between 200 and 400 mm.

Thus, the moving detector in its inner position is located in the immediate vicinity of the core, for example a radial distance in the order of 200 mm from the core.

The distance is taken relative to the nuclear fuel assembly located closest to the neutron detector.

The inner position is chosen such that, when the nuclear reactor 1 is stopped, the neutron flux at the moving detector 12 corresponds to counting between 1 and 100 blows per second, preferably between 5 and 50 per second, with an acceptable response time, for example a filtering time constant from several seconds to tens of seconds. For example, the inner position is chosen such that the counting rate is 5 blows per second.

In principle, there is no limitation on the inner position of the moving detector, which can be extremely close to the core so as to reach the minimal counting even with a very low residual activity of the core when stopped.

The outer position is chosen such that, when the nuclear reactor 1 is operating at full power, the neutron flux at the moving detector 12 corresponds to a measurement staying within a measuring range in the current mode of the moving detector 12.

Typically, the normal measuring range in current mode of a detector with a measuring member of type CFUC07 is 2 mA at the top of the range.

The fixed detectors typically make it possible to cover the power range from 0.1% to 100% of the nominal power.

The moving detectors are used when stopped and typically cover the power range of up to 1% of the nominal power.

Thus, the positioning of the moving detectors relative to the fixed detectors makes it possible for there to be an overlap between the power range covered by the moving detectors in the inner position, and the power range covered by the fixed detectors and the moving detectors in the outer position.

When the moving detectors are in the outer position, the measurements for the protection of the reactor are done by the fixed detectors. The moving detectors are used to detect any azimuth distortions of the neutron flux, making it possible for example to detect an untimely drop of a neutron absorbing member.

The movement mechanism 29 is designed to ensure the movement of the moving detector 12 and the safe detection of its radial position in the primary water layer 7.

According to one advantageous variant, the movement mechanism is of the electromechanical type (FIG. 5).

This movement mechanism 29 comprises a support surface 31, a sliding surface 33 on which the moving detector 12 is fixed, and a driving device 35 of the sliding support 33 along the support surface 31.

The support surface 31 is for example rail, extending radially, or any other suitable support. In this case, the sliding support 33 slides in the rail.

The driving device 35 is for example a motorized screw, as shown in FIG. 5. The device includes a stepping motor 37, with or without reducing gear, and a screw 39 rotated by the motor 37. The screw 39 cooperates with a nut-forming member, arranged in the sliding support 33. The screw 39 extends radially. It is selectively rotated by the motor 37 either in the clockwise direction or in the counterclockwise direction. The motor 37 is controlled by a control member 41 belonging to the measuring device 11.

Thus, the detector 12 moves radially toward the central axis X or on the contrary away from the axis X, depending on the rotation direction of the motor 37.

According to a variant that is not shown, the motor 37 rotates the screw 39 by means of a kinematic chain, not shown, including angle transmissions, such that the motor 37 is positioned in a zone of the vessel 3 that is protected from neutrons coming directly from the core. For example, the motor 37 is arranged at a distance above the core 5.

The driving mechanism of the screw/nut type can for example be derived directly from control provisions of cluster control mechanisms of the type described in the French application published under number FR 3,039,695.

The radial position of the moving detector 12 is measured either using an encoder integrated into the motor 37, or using end-of-travel detectors provided to detect when the moving detector 12 reaches the inner position and the outer position.

The position of the moving detector 12 can also be calculated by measuring the number of control pitches delivered to the phases of the motor 37 or the number of rotation pitches of the rotor of the motor 37, as described for cluster control mechanisms in the patent application filed under filing number FR 1,653,366.

According to a variant that is not shown, the movement mechanism of the moving detector 12 is exclusively mechanical. This mechanism is arranged so that the moving detector 12 is placed radially toward its outer position under the effect of the circulation of the primary water in the vessel 3, and returned by a passive return means toward its inner position. At high power, the substantial primary flow rate is used to move the detector radially outward. At low power, the reduced primary flow rate lets the passive return device return the detector toward the inner position.

For example, the movement mechanism includes a radial rail along which the moving detector is free to slide. It also includes partitions channeling the primary water flow toward the moving detector, arranged so that the primary water flow urges the moving detector radially toward the outside of the vessel. The passive return means is for example a spring. In a variant, the passive return means is gravity, the rail for example being inclined such that the moving detector 12 slides toward its inner position under the effect of its own weight. The travel of the moving detector is limited by mechanical stops, in the inner position and in the outer position. End-of-travel detectors make it possible to detect the arrival of the moving detector 12 in its inner and outer positions.

In one exemplary embodiment, the measuring device 11 comprises two moving neutron detectors 12 and three fixed neutron detectors 12, each associated with a measuring chain 24.

The two moving detectors 12 allow a safe measurement upon starting of the reactor.

The three fixed detectors 12 allow a safe measurement under power. When the nuclear reactor operates under power, the two moving detectors 12 are placed in their outer positions and remain operational. They make it possible to improve the knowledge of the neutron flow in azimuth.

Advantageously, the measuring device 11 further includes a spare moving detector 12, able to be connected to one of the five measuring chains 24 in case of failure of a fixed detector or a moving detector.

The control member 41 of the measuring device 11 is typically programmed to carry out the following steps:
when the nuclear reactor 1 is stopped or operating at a power below a first limit, measuring the neutron flux emitted by the core 5 with the or each moving detector 12 placed in the inner position;
when the nuclear reactor 1 is operating at a power above the first limit, measuring the neutron flux emitted by the core 5 with the or each fixed detector 12.

The first limit is for example equal to 1% of the nominal operating power of the reactor.

Advantageously, when the nuclear reactor 1 goes from a power below a second limit to a power above the second limit, the or each moving detector 12 is automatically moved to its outer position.

Conversely, when the nuclear reactor 1 goes from a power above the first limit to a power below the first limit, the or each moving detector 12 is automatically brought back to its inner position.

The second limit is equal to several percent of the nominal power of the reactor, for example 3%.

Other logics are possible for programming of the control member 41, as long as they respect the coverage principle of the chains previously defined.

According to another variant, the movements of the or each detector module 12 are controlled manually from the control room of the nuclear reactor.

The method for controlling the nuclear reactor 1 according to the second embodiment will now be described in detail.

The process comprises the following steps:
when the nuclear reactor 1 is stopped or operating at a power below a first limit, measuring the neutron flux emitted by the core 5 with the or each moving detector 12 placed in the inner position;
when the nuclear reactor 1 is operating with a power above the first limit, measuring the neutron flux emitted by the core 5 with the or each fixed detector 12.

Typically, the method further includes the following step:
moving the or each moving detector 12 to the outer position when the nuclear reactor 1 goes from a power below a second limit to a power above the second limit.

The first and second limits are those described above.

The controlling method preferably includes the step below:
when the nuclear reactor 1 goes from a power above the first limit to a power below the first limit, bringing the moving detectors back to an inner position.

This step is preferably done automatically, and triggered by each moving detector 12 as a function of its own measurement, autonomously.

The control member 41 of the measuring device 11 is programmed to carry out the above method.

According to an embodiment variant that is applicable to the second embodiment, each moving detector is movable not between two positions, namely an inner position and an outer position, but a plurality of radial positions, distributed between the inner position and the outer position.

This makes it possible to optimize the overlaps between the fixed detectors and the moving detectors.

A third embodiment of the invention will now be described, in reference to FIG. 6. Only the differences between the third embodiment and the first embodiment will be described in detail below.

Identical elements or elements performing the same function will be designated using the same references as in the first embodiment.

In the third embodiment, all of the neutron detectors 12 are fixed, and at least two of the neutron detectors 12 are positioned at different respective radial distances from the core 5 from one another, suitable for different power ranges of the nuclear reactor.

Preferably, the neutron detectors 12 are distributed at several different radial distances from the core 5 from one another, for example two different radial distances, three different radial distances or more than three different radial distances from one another.

Figure 6:
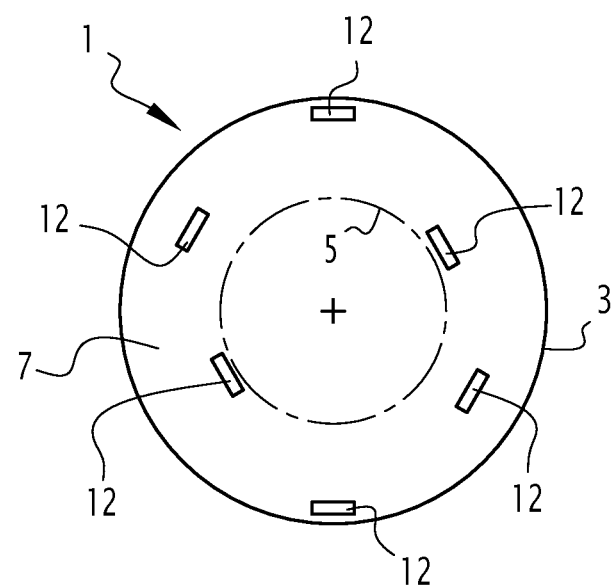
FIG. 6 is a view similar to that of FIG. 1, for a nuclear reactor according to a third embodiment of the invention.

In the example shown in FIG. 6, two neutron detectors 12 are positioned at a first radial distance from the core. These detectors are preferably diametrically opposite relative to the central axis of the vessel.

Two other neutron detectors 12 are positioned at a second radial distance from the core, smaller than the first distance. These detectors are preferably diametrically opposite relative to the central axis of the vessel.

Still two other neutron detectors 12 are positioned at a third radial distance from the core, midway between the first distance and the second distance. These detectors are preferably diametrically opposite relative to the central axis of the vessel.

This third embodiment makes it possible to switch the measurement gradually from the innermost detectors toward the outermost detectors, while benefiting from the best position in the range of measurements.

According to one embodiment variant, the neutron detectors 12 are located at respective radial distances from the core 5 that are all different from one another.

According to a fourth embodiment, the measuring device only includes moving neutron detectors. For example, the three fixed neutron detectors of the second embodiment are replaced by moving detectors. These additional moving detectors are of the same type as the moving detectors described in reference to the second embodiment.

The controller 17 and/or the control device 41 for example comprises an information processing unit formed by a processor and a memory associated with the processor. In a variant, the controller 17 and/or the control device 41 is made in the form of programmable logic components, such as FPGAs (Field-Programmable Gate Arrays) or dedicated integrated circuits, such as ASICs (Application-Specific Integrated Circuit).

The invention claimed is:

1. A pressurized water reactor comprising:
a vessel having a central axis;
a core positioned in the vessel, the core comprising a plurality of nuclear fuel assemblies, a primary water layer separating the core from the vessel radially from the central axis and surrounding the core;
an instrumentation and control system configured to provide an instrumentation and control of the reactor in a predetermined power range of the reactor, the instrumentation and control system comprising a measuring device for continuous measurement of a neutron flux emitted by the core;
at least one neutron absorbing member; and
a movement device configured for inserting the or each neutron absorbing member into the core,
the measuring device including a plurality of neutron detectors continuously measuring the neutron flux, the plurality of neutron detectors being positioned in the primary water layer radially between the core and the vessel, the plurality of neutron detectors each being radially positioned for obtaining, owing to an attenuation of the primary water layer, one or several counting rates configured for the instrumentation and control system of the reactor for an entirety of the predetermined power range, the predetermined power range being from a residual power upon stopping of the reactor to a nominal power of the reactor,
the instrumentation and control system comprising a controller configured to control the movement device by using measurements done by the plurality of neutron detectors,
wherein each of the plurality neutron detectors is positioned at a same fixed radial distance from the core as each other neutron detectors and is circumferentially spaced apart from each other neutron detector around the central axis of the vessel.

2. The reactor according to claim 1, wherein the plurality of neutron detectors are directly submerged in the primary water layer, without insertion of a gloved finger.

3. The reactor according to claim 1, wherein the plurality of neutron detectors are each being radially positioned such that:
   at the residual power upon stopping of the reactor, the neutron flux at the fixed detector corresponds to a counting of between 1 and 100 cp/s; and
   at the nominal power of the reactor, the neutron flux at the fixed detector corresponds to a measurement staying within a measuring range in a current mode of the fixed detector.

4. The reactor according to claim 1, wherein the plurality of neutron detectors include a moving detector radially movable relative to the core in the primary water layer.

5. The reactor according to claim 4, wherein the measuring device comprises a movement mechanism of the moving detector configured to move the moving detector radially at least between an inner position relatively closer to the core and an outer position relatively further from the core.

6. The reactor according to claim 5, wherein:
   the inner position is such that, when the nuclear reactor is stopped, the neutron flux at the moving detector corresponds to a counting of between 1 and 100 cp/s; and
   the outer position is such that, when the nuclear reactor is operating at full power, the neutron flux at the moving detector corresponds to a measurement staying within a measuring range in the current mode of the moving detector.

7. The reactor according to claim 1, wherein the plurality of neutron detectors include:
   at least one fixed detector positioned at a fixed radial distance from the core; and
   at least one moving detector radially movable relative to the core in the primary water layer.

8. A method for controlling the nuclear reactor according to claim 7, the method comprising the following steps:
   when the nuclear reactor is stopped or operating at a power below a first limit, measuring the neutron flux emitted by the core with the at least one moving detector, placed in an inner position; and
   when the nuclear reactor is operating at a power above the first limit, measuring the neutron flux emitted by the core with the at least one fixed detector.

9. The controlling method according to claim 8, wherein the at least one moving detector is moved to an outer position when the nuclear reactor goes from a power below a second limit to a power above the second limit.

10. The reactor according to claim 1, wherein the plurality of neutron detectors are arranged to have a sufficient counting rate upon starting up the reactor, allowing a suitable response time of the instrumentation and control system of the reactor in case of abnormal situation of the reactor.

11. The reactor according to claim 1, wherein the instrumentation and control system is configured to protect the reactor, based on information supplied by the at least one neutron detector.

12. The reactor according to claim 1, wherein the plurality of neutron detectors are configured to supply neutron measurements with a time constant ranging from several tens of seconds to a fraction of a second.

13. The reactor according to claim 1, wherein the pressurized water reactor is a small modular reactor.

14. The reactor according to claim 1, wherein the primary water layer has a radial thickness of between 100 and 800 mm.

15. The reactor according to claim 3, wherein the current mode of the fixed detector is 2 mA at a top of a measuring range of the fixed detector.

16. A pressurized water reactor comprising:
   a vessel having a central axis;
   a core positioned in the vessel, the core comprising a plurality of nuclear fuel assemblies, a primary water layer separating the core from the vessel radially from the central axis and surrounding the core;
   an instrumentation and control system configured to provide an instrumentation and control of the reactor in a predetermined power range of the reactor, the instrumentation and control system comprising a measuring device for continuous measurement of a neutron flux emitted by the core;
   at least one neutron absorbing member; and
   a movement device configured for inserting the or each neutron absorbing member into the core,
   the measuring device including a plurality of neutron detectors continuously measuring the neutron flux, the plurality of neutron detectors being positioned in the primary water layer radially between the core and the vessel, the plurality of neutron detectors being radially positioned for obtaining, owing to an attenuation of the primary water layer, one or several counting rates configured for the instrumentation and control system of the reactor for an entirety of the predetermined power range including a nominal power of the reactor,
   the instrumentation and control system comprising a controller configured to control the movement device by using measurements done by the plurality of neutron detectors,
   wherein each of the plurality of detectors is fixed, and at least two of the plurality neutron detectors are positioned at different respective radial distances from the core from one another and configured for different power ranges of the reactor.

* * * * *